US012579713B2

(12) United States Patent
Showalter et al.

(10) Patent No.: US 12,579,713 B2
(45) Date of Patent: Mar. 17, 2026

(54) TEXT-GUIDED IMAGE EDITING BY LEARNING GUIDANCE SCALES VIA REINFORCEMENT LEARNING

(71) Applicant: QUALCOMM Incorporated, San Diego, CA (US)

(72) Inventors: Samuel Showalter, Irvine, CA (US); Risheek Garrepalli, San Diego, CA (US); Debasmit Das, San Diego, CA (US); Munawar Hayat, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 18/422,692

(22) Filed: Jan. 25, 2024

(65) Prior Publication Data

US 2025/0245883 A1     Jul. 31, 2025

(51) Int. Cl.
| | |
|---|---|
| *G09G 5/10* | (2006.01) |
| *G06T 5/70* | (2024.01) |
| *G06T 11/60* | (2006.01) |

(52) U.S. Cl.
CPC ............... *G06T 11/60* (2013.01); *G06T 5/70* (2024.01)

(58) Field of Classification Search
CPC ......... G06T 11/60; G06T 11/40; G06T 19/00; G06T 11/00; G06T 11/20; G06T 11/206; G06T 7/0012; G06T 2207/10081; G06T 2207/30004; G06T 11/203; G06T 2211/441; G06T 2210/28; G06T 11/001; G06T 2200/12; G06F 9/4443; G06F 3/0481; G06F 30/13; G06F 3/04845; G06F 3/04883; G06F 40/143; G06F 16/54; G06F 16/56; G06F 16/5838; G06F 16/58; G06F 16/55; G06F 40/40; G06V 20/20; G06V 10/7753; G11B 27/10; H04N 21/47217;
(Continued)

(56) References Cited

U.S. PATENT DOCUMENTS

| | | | |
|---|---|---|---|
| 2024/0171788 A1* | 5/2024 | Kreis | ..................... G06T 3/4053 |
| 2025/0225627 A1* | 7/2025 | Rao | ............................ G06T 5/70 |

OTHER PUBLICATIONS

Black K., et al., "Training Diffusion Models with Reinforcement Learning", Arxiv.Org, Cornell University Library, 201 Olin Library Cornell University Ithaca, NY 14853, arXiv:2305.13301v1 [cs.LG] , May 22, 2023, XP091515984, pp. 1-20, The Whole Document.
(Continued)

*Primary Examiner* — Gordon G Liu
(74) *Attorney, Agent, or Firm* — Patterson & Sheridan LLP

(57) ABSTRACT

Certain aspects of the present disclosure provide techniques and apparatus for improved machine learning. In an example method, a first latent tensor generated during a first iteration of processing data using a denoising backbone of a diffusion machine learning model is accessed. A guidance scale is generated based on processing the first latent tensor using a guidance machine learning model. A second latent tensor is generated during a second iteration of processing data using the denoising backbone based on the first latent tensor and the first guidance scale, and an output from the diffusion machine learning model is generated based at least in part on the second latent tensor.

15 Claims, 7 Drawing Sheets

(58) Field of Classification Search
CPC ........ G16H 30/20; G06N 20/20; G06N 3/045;
G06N 3/047; G06N 3/08; G06Q 30/0643
USPC ........................................................ 345/619
See application file for complete search history.

(56) References Cited

OTHER PUBLICATIONS

Dhariwal P., et al., "Diffusion Models Beat GANs on Image
Synthesis", Arxiv.Org, Cornell University Library, 201 Olin Library
Cornell University Ithaca, NY 14853, arXiv:2105.05233v4 [cs.LG],
Jun. 1, 2021, XP081981283, pp. 1-44, The Whole Document.
Ho J., et al., "Classifier-Free Diffusion Guidance", Arxiv.Org,
Cornell University Library, 201 Olin Library Cornell University
Ithaca, NY 14853, arXiv:2207.12598v1 [cs.LG], Jul. 26, 2022,
XP091280198, pp. 1-14, The Whole Document.
International Search Report and Written Opinion—PCT/US2024/
058477—ISA/EPO—Apr. 9, 2025.
Brooks T., et al., "InstructPix2Pix: Learning to Follow Image
Editing Instructions", arXiv:2211.09800v2 [cs.CV], Jan. 18, 2023,
pp. 1-15.
Liu N., et al., "Compositional Visual Generation with Composable
Diffusion Models", arXiv:2206.01714v6 [cs.CV], Jan. 17, 2023, pp.
1-30.
Zhang L., et al., "Adding Conditional Control to Text-to-Image
Diffusion Models", arXiv:2302.05543v3 [cs.CV], Nov. 26, 2023, 12
pages.

* cited by examiner

300

305
Access reference image and prompt

310
Generate a noisy latent tensor

315
Generate guidance scale(s) based on the current latent tensor

320
Generate denoised latent tensor based on guidance scale(s)

325
Additional iteration(s)?

Yes

No

330
Generate output image

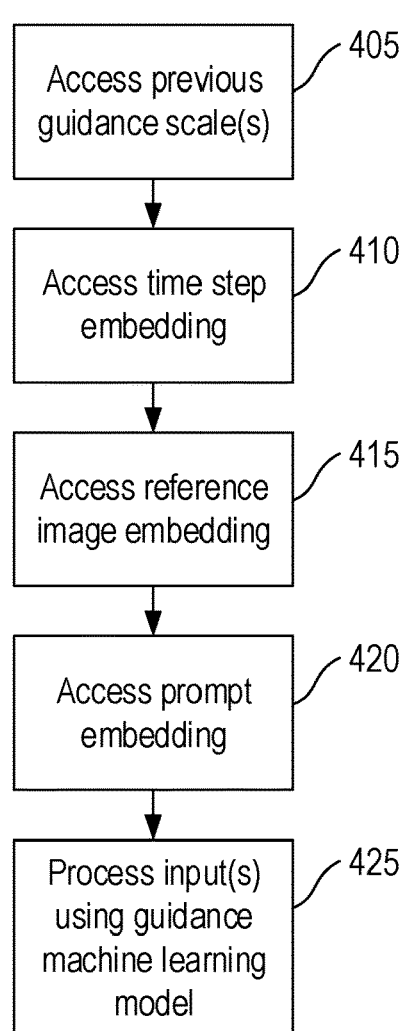
400
Access previous
guidance scale(s) — 405
Access time step
embedding — 410
Access reference
image embedding — 415
Access prompt
embedding — 420
Process input(s)
using guidance
machine learning
model — 425
*FIG. 4*

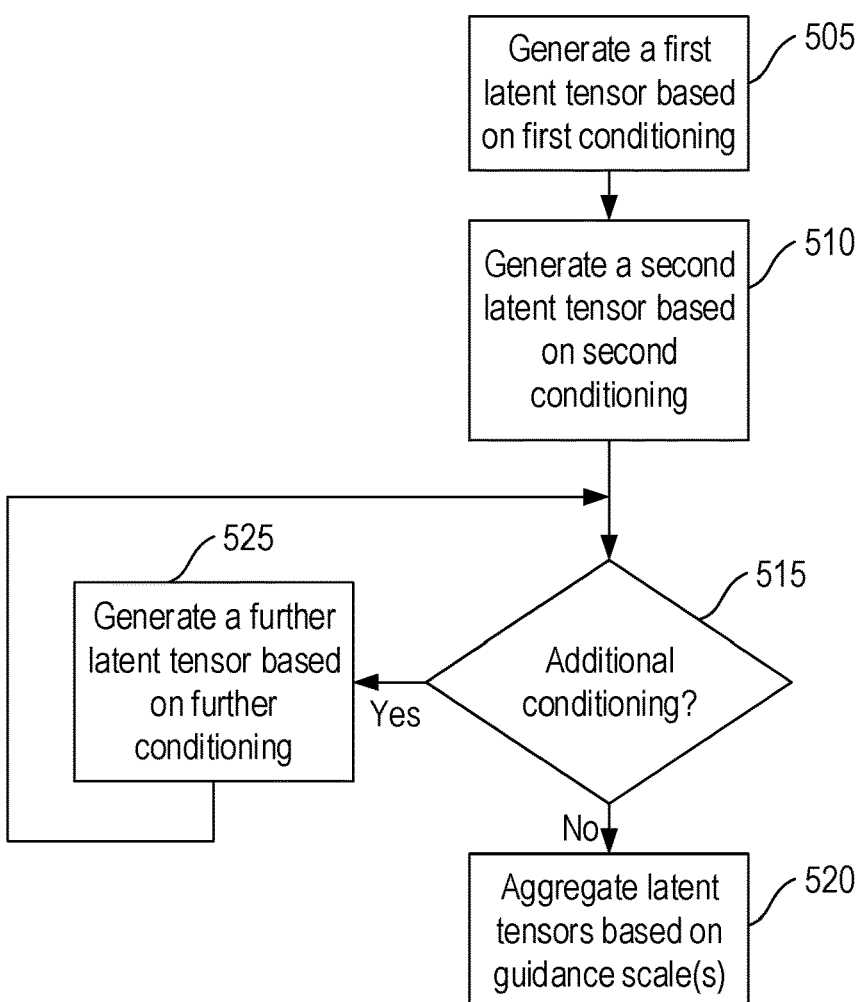
*FIG. 5*

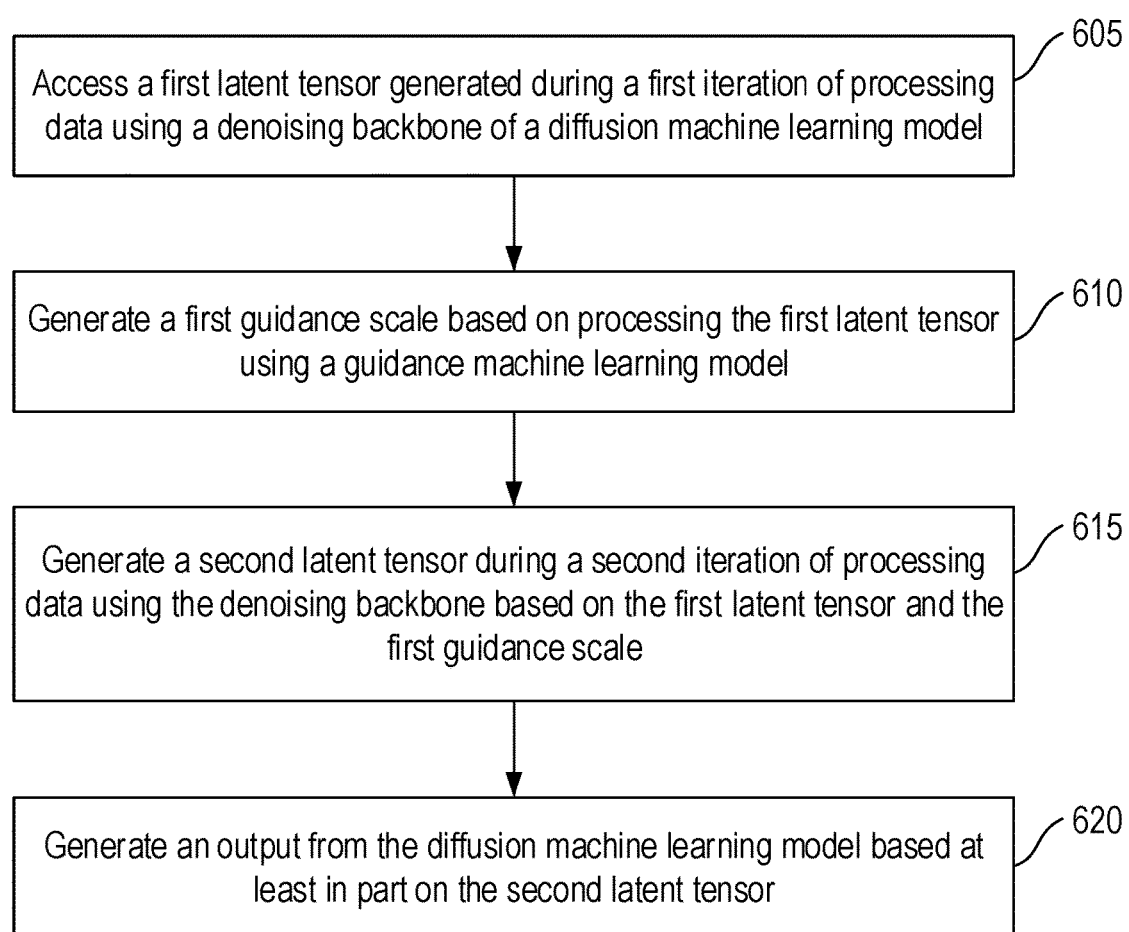

600

605
Access a first latent tensor generated during a first iteration of processing data using a denoising backbone of a diffusion machine learning model 610
Generate a first guidance scale based on processing the first latent tensor using a guidance machine learning model 615
Generate a second latent tensor during a second iteration of processing data using the denoising backbone based on the first latent tensor and the first guidance scale 620
Generate an output from the diffusion machine learning model based at least in part on the second latent tensor

*FIG. 6*

TEXT-GUIDED IMAGE EDITING BY LEARNING GUIDANCE SCALES VIA REINFORCEMENT LEARNING

INTRODUCTION

Aspects of the present disclosure relate to machine learning.

A wide variety of machine learning models have been trained for a similarly vast assortment of tasks in recent years. For example, generative models (e.g., generative adversarial models (GANs), diffusion models, and the like) have been trained to generate new output data (e.g., images or text) based on input prompts. In some cases, generative models have been trained to enable input editing based on various prompts. For example, some models are able to receive an input image (e.g., a picture of a sailboat) and a textual prompt indicating how to edit or transform the image (e.g., "make the sail green"). The generative image editing model can generate an edited image that is similar to the reference image, but modified in accordance with the prompt (e.g., an image of a sailboat with green sails).

BRIEF SUMMARY

Certain aspects of the present disclosure provide a processor-implemented method, comprising: accessing a first latent tensor generated during a first iteration of processing data using a denoising backbone of a diffusion machine learning model; generating a first guidance scale based on processing the first latent tensor using a guidance machine learning model; generating a second latent tensor during a second iteration of processing data using the denoising backbone based on the first latent tensor and the first guidance scale; and generating an output from the diffusion machine learning model based at least in part on the second latent tensor.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the present disclosure and are therefore not to be considered limiting of the scope of this disclosure.

FIG. 4 is a flow diagram depicting an example method for generating dynamic guidance scales using guidance machine learning models, according to some aspects of the present disclosure.

FIG. 5 is a flow diagram depicting an example method for generating and aggregating latent tensors using dynamic guidance scales, according to some aspects of the present disclosure.

FIG. 6 is a flow diagram depicting an example method for using guidance machine learning models, according to some aspects of the present disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
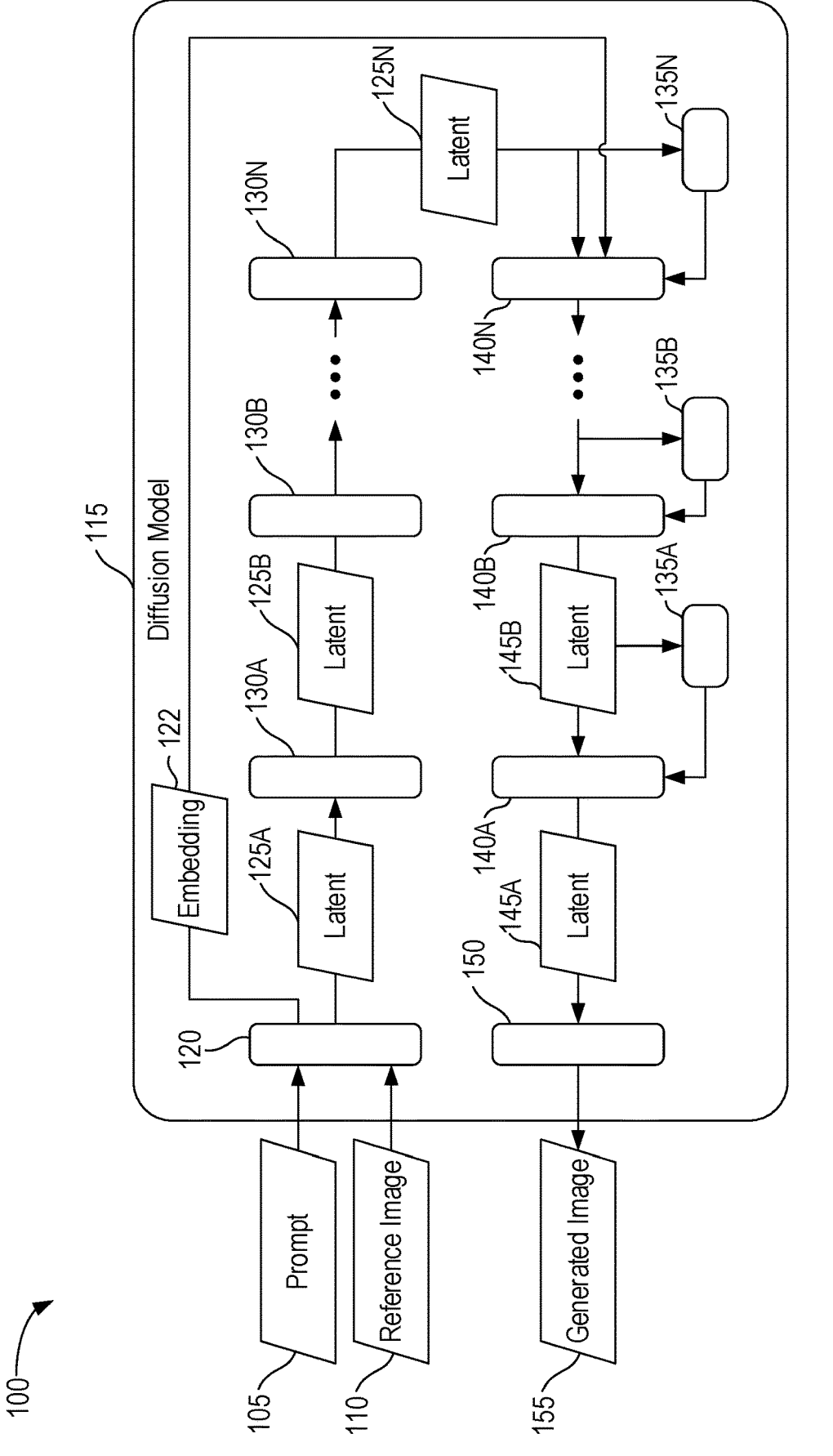
FIG. 1 depicts an example workflow for performing inverse diffusion using diffusion machine learning models with dynamic guidance scales, according to some aspects of the present disclosure.

Aspects of the present disclosure provide apparatuses, methods, processing systems, and non-transitory computer-readable mediums for providing improved machine learning.

In some aspects of the present disclosure, machine learning models for text-guided image editing are provided. In such tasks, a machine learning model is provided with a reference image and a textual prompt or instruction. The model is tasked with generating an output image that preserves the original image while also fulfilling the textual instruction. Although text-based image editing is used in some examples, aspects of the present disclosure are readily applicable to a wide variety of other generative tasks, such as video editing, audio editing, editing inputs based on image and/or audio prompts (in addition to or instead of textual prompts), and the like.

Many guided diffusion architectures (e.g., classifier-free diffusion models) rely on scale hyperparameters to determine the influence of the guidance. Such scales (referred to in some aspects as guidance scales) are generally used to determine or control the amount of influence the prompt is given. For example, suppose a reference image depicting a marble statue is provided as input, as well as a textual prompt such as "turn the statue into a cyborg." In some aspects, the guidance scale(s) define how much weight to give the prompt, as compared to the image. For example, low scales (e.g., low weight for the prompt) may cause the output to be very similar to the reference image, with minimal editing. In contrast, high scales (e.g., low weight for the prompt) may cause the output to be very faithful to the textual prompt, potentially sacrificing or losing substantial details from the original reference image.

In some systems, the scales are manually defined as hyperparameters (e.g., based on trial and error). For example, a user (e.g., a data scientist) may iteratively set the scale(s) to a given value (or set of values) and generate output(s). By visually evaluating each such output (generated using different scales), the user may subjectively select which guidance scale value(s) the user prefers. Such systems do not allow or enable any objective way to determine the optimal (or at least improved) guidance scales, let alone to determine appropriate scales on a per-sample basis. However, generation quality (e.g., the quality of the generated images) is highly sensitive to these scale hyperparameters, particularly when there are multiple forms of guidance.

In some aspects of the present disclosure, guidance scales can be dynamically generated for a given sample (e.g., based on the input image and/or prompt). In some aspects, the guidance can be varied as often as each iteration or time step (e.g., generating new guidance scales for each iteration of a denoising backbone), or more sparsely through the generation process of a sample (e.g., generating a single set of guidance scales that are used at each iteration).

In some aspects, guidance scales can be generated using a relatively small machine learning model (e.g., a neural network), referred to herein as a "guidance machine learning model," that uses various data as input. Generally, the particular inputs may vary depending on the particular implementation. For example, in some aspects, the guidance machine learning model may process data such as latent tensor(s) being denoised, an embedding of the input reference image, an embedding of the input text prompt, a time step embedding indicating which iteration is being performed, and the like.

Example Workflow for Performing Inverse Diffusion Using Diffusion Machine Learning Models with Dynamic Guidance Scales FIG. 1 depicts an example workflow 100 for performing inverse diffusion using diffusion machine learning models with dynamic guidance scales, according to some aspects of the present disclosure. In some aspects, the workflow 100 is performed by a machine learning system (e.g., a computing system configured to perform machine learning operations).

In the illustrated example, a prompt 105 (e.g., a textual prompt) and a reference image 110 are processed using a diffusion model 115 (also referred to in some aspects as a diffusion machine learning model) to generate a generated image 155. In some aspects, the prompt 105 comprises natural language text indicating how the reference image 110 should be modified or edited. For example, the reference image 110 may depict a sailboat in the ocean, and the prompt 105 may include "change the sails to blue." In the illustrated example, the generated image 155 generally corresponds to the reference image 110, as modified based on the prompt 105. For example, the generated image 155 may depict the sailboat with blue sails. As discussed above, in some aspects, the guidance scale(s) used by the diffusion model 115 may affect the generated image 155. For example, low guidance scales for the prompt 105 may result in a generated image 155 that is highly similar to the reference image 110 (e.g., the same sailboat, with the sails somewhat more blue), while high guidance scales may result in a generated image 155 that is highly similar to the prompt 105 (e.g., a sailboat with blue sails, but where other features such as details of the boat, the ocean, the background, and/or the like, may be changed).

As illustrated, the diffusion model 115 may generally use two main operations to generate the generated image 155: a forward pass and a reverse or inverted pass. Generally, during the forward pass, the diffusion model 115 iteratively adds noise to the reference image 110. In some aspects, noise is added until the reference image 110 effectively contains random (e.g., Gaussian) noise. During the reverse pass (also referred to as the inverse pass and/or the denoising operation), the diffusion model 115 iteratively removes the noise, conditioned based on the prompt 105, to yield the generated image 155. In some aspects, this reverse pass is performed using a denoising backbone of the diffusion model 115. As used herein, a "denoising backbone" refers to one or more components of a diffusion machine learning model that are used to denoise latent tensors to recover or generate a target output (e.g., an image). For example, one or more trained components (e.g., components that transform latent tensors based on parameters having values learned during a training phase) may be used to iteratively remove noise or and/or construct signal in the latent tensor based on various conditioning (e.g., based on textual prompts) to generate outputs.

Specifically, in the illustrated example, the prompt 105 and reference image 110 are first processed by an embedding operation 120, which generates a prompt embedding 122 and an image embedding (depicted as a latent tensor 125A), respectively. The embedding operation 120 may generally correspond to a trained component (e.g., an operation that uses parameters having values learned during training) that generates embeddings for input data. For example, the embedding operation 120 may project the input to a latent space, where each embedding is a relatively high dimension tensor (e.g., a vector having a relatively large number of values) in the latent space. In some aspects, the prompt 105 and reference image 110 may be processed using separate embedding operations (e.g., a first component trained to generate text embeddings and a second component trained to generate image embeddings).

In the illustrated example, the embedding operation 120 generates a latent tensor 125A. In some aspects, the latent tensor 125A corresponds to the reference image 110. That is, the latent tensor 125A may be the embedding of the reference image 110. As illustrated, the latent tensor 125A is then processed by a noising operation 130A to generate a latent tensor 125B. In some aspects, the noising operation 130A generally corresponds to adding at least some amount of noise to the latent tensor 125A (e.g., perturbing or changing one or more values in the latent tensor 125A). In some aspects, the noising operation 130A adds random Gaussian noise. In some aspects, the noising operation 130A is a trained component (e.g., adding noise based on parameters having values learned during training).

As illustrated, the latent tensor 125B is then processed using another noising operation 130B to generate another latent tensor having more noise than the latent tensor 125B. Generally, as discussed above, this forward diffusion process iteratively adds noise over multiple iterations (also referred to as time steps in some aspects) until a noisy latent tensor 125N is generated by the final noising operation 130N. As indicated by the ellipses, the diffusion model 115 may use any number of iterations. Although depicted as discrete noising operations 130A-N for conceptual clarity, in some aspects, the noising operations 130 may use shared parameters. That is, the diffusion model 115 may use the same noising operation 130 to iteratively process the latent tensors 125 for N iterations. In some aspects, this use of noising operation(s) 130 to generate the latent tensors 125N may be referred to as the forward diffusion process, as discussed above.

More generally, the forward diffusion process may be defined using $P(x_{t+1}|x_t)$. That is, the latent tensor in a given iteration $x_{t+1}$ (at iteration t+1) may be generated based on processing the latent tensor from the prior iteration $(x_t)$ using a noising operation 130. By repeating this noising process for some number of iterations, the latent tensor 125N is generated. In some aspects, the latent tensor 125N corresponds to or comprises random (e.g., Gaussian) noise. By convention, the output of the final iteration of the forward diffusion process (e.g., the noising operation 130N) is referred to as the T-th output (e.g., after adding noise at time step T–1), and the first iteration (e.g., the noising operation 130A) is referred to as the 0-th iteration (e.g., adding noise at time step 0).

As illustrated, the latent tensor 125N is then processed using a denoising operation 140N, as well as by a guidance component 135N. The guidance component 135N processes the latent tensor 125N to generate a set of one or more guidance scales (e.g., values for the guidance scale(s)), which are provided to the denoising operation 140N. The denoising operation 140N processes the latent tensor 125N to generate a new (relatively denoised) latent tensor based at least in part on the guidance scale(s).

In the illustrated example, the denoising operation 140N further receives the embedding 122 (generated based on the prompt 105) as input to generate the denoised latent tensor. Although not depicted in the illustrated example, in some aspects, each subsequent denoising operation 140 may similarly receive, as input, the embedding 122 of the prompt 105. For example, as discussed above, the guidance scales may indicate how much the latent tensor should reflect the prompt 105, as compared to how much the latent tensor should reflect the reference image 110. In some aspects, where multiple prompts are used, the guidance scales may indicate how much each prompt affects the output latent tensor. For example, suppose the prompt 105 includes a first text prompt such as "add trees to the background," "make it nighttime," and "delete the red car." In some aspects, the guidance scales may indicate a weight for each of these prompts, and these weights may all be different.

In some aspects, the denoising operation 140N and the guidance component 135N are trained components (e.g., operations performed using parameters having values learned during a training operation). Although not depicted in the illustrated example, in some aspects, the guidance component 135N may receive additional inputs to generate the guidance scales. For example, the guidance component 135N may evaluate inputs such as the prompt 105 (or the embedding 122), the reference image 110 (or the embedding of the reference image 110, such as the latent tensor 125A), the guidance scale(s) used during a prior iteration of the denoising backbone (if any), and/or the like. In some aspects, the guidance component 135N may be referred to as a guidance machine learning model.

As illustrated, a subsequent denoised latent tensor is then processed by a guidance component 135B, which generates guidance scales that are input to a denoising operation 140B. The denoising operation 140B processes the input latent tensor and the guidance scales to generate a new latent tensor 145B. Further, the latent tensor 145B is processed by a guidance component 135A, which generates a new set of guidance scales. These new guidance scales are used by the denoising operation 140A, along with the latent tensor 145B, to generate a latent tensor 145A.

Generally, as discussed above, this reverse diffusion process iteratively removes noise over multiple iterations (also referred to as time steps in some aspects) until the denoised latent tensor 145A is generated. As indicated by the ellipses, the diffusion model 115 may use any number of iterations. Although depicted as discrete denoising operations 140A-N for conceptual clarity, in some aspects, the denoising operations 140 may use shared parameters. That is, the diffusion model 115 may use the same denoising operation 140 to iteratively process the latent tensors 145 for N iterations. In some aspects, the denoising operation(s) 140 may be referred to as the denoising backbone, as discussed above.

More generally, the reverse diffusion process may be defined using $q_\theta(x_{t-1}|x_t)$. That is, the latent tensor in a given iteration $x_{t-1}$ (at iteration t–1) may be generated based on processing the latent tensor from the prior iteration $(x_t)$ using a denoising operation 140 $(q)$ which uses parameters $\theta$ (e.g., trained parameters having values learned during training). By repeating this denoising process for some number of iterations, the latent tensor 145A is generated. By convention, the final output of the reverse diffusion process (e.g., the denoising operation 140A) is referred to as the 0-th output (e.g., after removing noise at time step 1), and the first iteration (e.g., the denoising operation 140N) is referred to as the T-th iteration (e.g., removing noise at time step T).

Additionally, in some aspects, the guidance machine learning model may be defined using $\Pi_\Theta(\lambda_{t-1}|x_t)$. That is, the guidance scales for a given iteration $\lambda_{t-1}$ may be generated based on processing the latent tensor from the prior iteration $(x_t)$ using a denoising operation 140 $(\Pi)$ which uses parameters $\Theta$ (e.g., trained parameters having values learned during training). By repeating this denoising process for some number of iterations, the latent tensor 145A is generated.

In some aspects, as discussed above, each guidance component 135 may further evaluate additional data, such as the embedding of the reference image 110, the embedding of the prompt 105, an embedding of the current iteration or time step, the guidance scale(s) from the prior iteration, and/or the like. For example, the guidance component 135A may process the latent tensor 145B, the text prompt embedding 122, the reference image embedding (e.g., the latent tensor 125A), the time step embedding for the 0-th iteration (e.g., an embedding indicating that the 0-th iteration is currently being performed), and/or the guidance scales generated by the guidance component 135B, to generate guidance scales for the denoising operation 140A in the final iteration.

In some aspects, as discussed above, multiple guidance scales may be generated for any given iteration. For example, the guidance components 135 may generate a separate scale for each prompt 105 (if multiple prompts are used), a scale for the reference image 110, and the like. Although the illustrated example depicts generating new guidance scales for each iteration of processing data using the denoising backbone, in some aspects, the machine learning system may generate guidance scales more sparsely. For example, a set of guidance scales may be generated based on processing the latent tensor 125N using a guidance machine learning model, and these guidance scales may then be used for multiple (e.g., for all of the) denoising iterations.

In the illustrated example, the latent tensor 145A is processed by a decoding operation 150 to generate the generated image 155. The decoding operation 150 may generally correspond to a trained component (e.g., an operation that uses parameters having values learned during training) that generates images based on input latents. For example, the decoding operation 150 may project the latent tensor from the latent space to the image space.

In some aspects, the workflow 100 uses a pre-trained diffusion model. That is, some portions of the diffusion model 115 (e.g., the embedding operation 120, the noising operation(s) 130, the denoising operation(s) 140, and/or the decoding operation 150) may be pre-trained components (e.g., components of a pre-trained classifier-free diffusion model). Rather than manually defining the guidance scales, the guidance component(s) 135 may then be trained to generate guidance scales for the denoising process.

In some aspects, the guidance component(s) 135A-N are trained using one or more diffusion loss functions. For example, in some aspects, the input to the guidance component(s) 135A-N include the latent tensor generated for the previous time step or iteration (e.g., the latent tensor 145B generated by the denoising operation 140B is used as input to the guidance component 135A). In some aspects, the guidance component 135 inputs further include the text conditioning (e.g., the embedding 122). As discussed above, the guidance component 135 uses these inputs to generate or predict the guidance scalar value(s), which are then consumed by the pre-trained diffusion model (e.g., the denoising operation 140 during the current iteration) to generate the next denoised latent output. In some embodiments, the final generated output from the diffusion model (e.g., the generated image 155) can then be compared against the ground-truth output (e.g., the target edited image) and a loss value can be computed using standard diffusion loss. This loss may then be used to refine the parameters of the guidance components 135.

Figure 2:
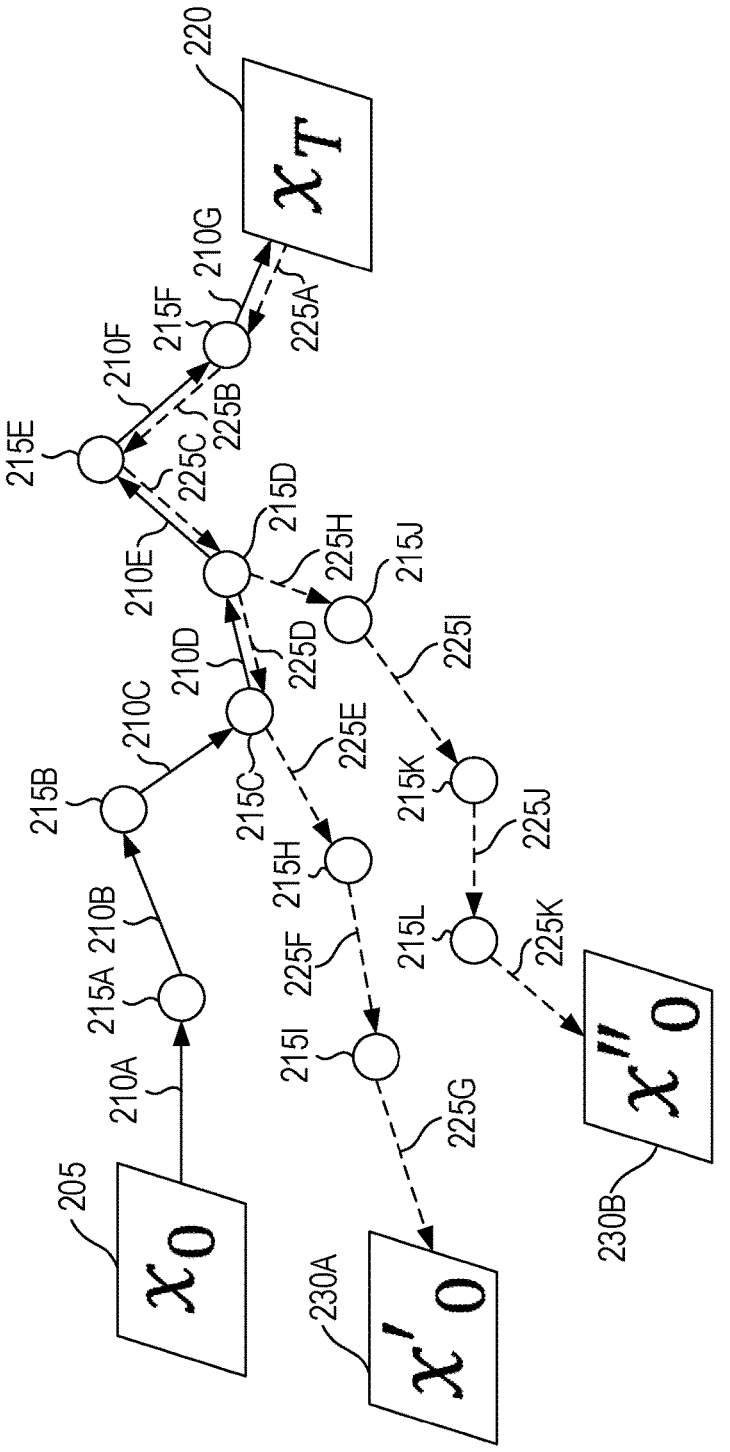
FIG. 2 depicts an example workflow for merging trajectories using dynamic guidance scales in a denoising backbone of a diffusion model, according to some aspects of the present disclosure.

Example Workflow for Merging Trajectories Using Dynamic Guidance Scales in a Denoising Backbone of a Diffusion Model FIG. 2 depicts an example workflow 200 for merging trajectories using dynamic guidance scales in a denoising backbone of a diffusion model, according to some aspects of the present disclosure. In some aspects, the workflow 200 is used by a machine learning system, such as the machine learning system discussed above with reference to FIG. 1.

In some aspects, the workflow 200 depicts the forward and reverse diffusion process for a diffusion model, such as the diffusion model 115 of FIG. 1. In the illustrated example, a diffusion model (e.g., a pre-trained model) may be utilized to commit an image through the forward process of diffusion, creating a sequence of latent tensors from $x_0$ (latent tensor 205) to $x_T$ (latent tensor 220). In some aspects, the noise maps (e.g., the maps used to add noise to the interim latent tensors at each iteration) are then used to create inverse noise maps z for each iteration. These inverse noise maps can then be utilized until a "skip" step threshold is reached, as discussed in more detail below. Then, the latent tensors may be edited by injecting a new edit caption to generate a new diffusion direction.

Specifically, the latent tensor 205 (which may correspond to an image embedding for a reference image, such as the latent tensor 125A for the reference image 110) is processed by a first noising operation 210A (e.g., the noising operation 130A of FIG. 1) to generate an interim latent tensor 215A. The latent tensor 215A is then processed using a noising operation 210B to generate a latent tensor 215B, which is processed using a noising operation 210C to generate a latent tensor 215C. The latent tensor 215C is processed using a noising operation 210D to generate a latent tensor 215D, which is processed using a noising operation 210E to generate a latent tensor 215E. The latent tensor 215E is processed using a noising operation 210F to generate a latent tensor 215F, which is processed using a noising operation 210G to generate the latent tensor 220 (e.g., the latent tensor 125N of FIG. 1).

As discussed above, in some aspects, each noising operation 210A-G may correspond to using a single noising component iteratively. Although seven noising iterations are depicted, in some aspects, the machine learning system may use any number of noising iterations, as discussed above. In some aspects, the number of noise iterations may be a hyperparameter of the diffusion model.

In the illustrated workflow, the machine learning system then performs the reverse diffusion process. As discussed above, in some systems, the text prompt(s) may be used to condition this reverse diffusion process for one or more iterations. However, in the illustrated example, the machine learning system may "skip" this conditioning for one or more iterations.

Specifically, in the illustrated example, the latent tensor 220 is processed using a denoising operation 225A (e.g., the denoising operation 140N of FIG. 1) to generate or recover the latent tensor 215F. In some aspects, the denoising operation 225A corresponds to using the denoising backbone but not conditioning the diffusion using the prompt text (e.g., to recover the original reference image). In some aspects, the denoising operation 225A corresponds to removing the noise that was added during the noising operation 210G (e.g., based on the noise map from that iteration). In some aspects, rather than generating the latent tensor 215F, the machine learning system may instead store the latent tensor 215F during the forward diffusion, and retrieve this stored latent tensor 215F during the reverse diffusion process.

Further, as illustrated, the latent tensor 215F is processed using a denoising operation 225B to yield the latent tensor 215E, and the latent tensor 215E is processed using a denoising operation 225C to yield the latent tensor 215D. In some aspects, as discussed above, the denoising operations 225B and 225C may correspond to processing the latents with a denoising process without conditioning based on the prompt, may correspond to applying the inverted noise maps generated during the forward pass, and/or may correspond to retrieving the latent tensors 215E and 215D from storage or memory. That is, in some aspects, the denoising operations 225B and 225C may perform the denoising operations without using the prompt (e.g., by using an empty string, rather than the prompt text).

In the illustrated example, the denoising iteration that receives the latent tensor 215D as input serves as a first skip step, where the diffusion trajectory is split. Specifically, as illustrated, the latent tensor 215D is processed using a denoising operation 225H to generate a latent tensor 215J. As illustrated, this latent tensor 215J diverges from the original trajectory of the forward pass, and represents the conditioning of the denoising. For example, the denoising operation 225H may be performed by conditioning the denoising based on the text prompt, as discussed above. Advantageously, by only beginning the prompt conditioning in this interim iteration (rather than for the entire denoising backbone), the machine learning system may generate output images that are more similar to the reference image, preserving the original structure and features.

As illustrated along this trajectory, the latent tensor 215J is processed using a denoising operation 225I to generate a latent tensor 215K, which is then processed using a denoising operation 225J to generate a latent tensor 215L. The latent tensor 215L is then processed using a denoising operation 225K to generate a latent tensor 230B (labeled $x''_0$). In some aspects, some (or all) of the denoising operations 225H, 225I, 225J, and/or 225K may be performed as discussed above, using the prompt text(s) to condition the denoising in order to generate an edited image.

In the illustrated workflow, the latent tensor 215D is also processed using a denoising operation 225D to yield the latent tensor 215C. As discussed above, in some aspects, this denoising operation 225D follows the original trajectory of the forward pass, and is generally performed without conditioning the denoising using the text prompt. As illustrated, this iteration serves as a second skip step for the denoising. Specifically, as illustrated, the latent tensor 215C is processed using a denoising operation 225E to generate a latent tensor 215H. This latent tensor 215H also diverges from the original trajectory of the forward pass, and represents the conditioning of the denoising. For example, the denoising operation 225E may be performed by conditioning the denoising based on the text prompt, as discussed above.

As illustrated along this trajectory, the latent tensor 215H is processed using a denoising operation 225F to generate a latent tensor 215I, which is then processed using a denoising operation 225G to generate a latent tensor 230A (labeled $x'_0$). In some aspects, some (or all) of the denoising operations 225E, 225F, and/or 225G may be performed as discussed above, using the prompt text(s) to condition the denoising in order to generate an edited image.

Generally, the latent tensors 230A and 230B may correspond to different edits or revisions to the reference image (e.g., different diffusion trajectories), where the differences may be caused by different skip steps, different conditioning prompts, or a combination of different prompts and different skip steps. In some aspects, the latent tensors 230A and 230B may each be processed by a decoder (e.g., the decoding operation 150 of FIG. 1) to generate output images (e.g., generated image 155 of FIG. 1).

Although not illustrated in the depicted example, in some aspects, one or more of the denoising operations may also use guidance scales generated dynamically based on one or more of the latent tensors, as discussed above. For example, the denoising operation 225H may include use of guidance scales that are generated (at least in part) on the latent tensor 215D (e.g., using a guidance machine learning model, such as the guidance component 135 of FIG. 1).

In some aspects, a denoising trajectory (also referred to in some aspects as an inverse trajectory) may be defined based on the "skip step" (e.g., which iteration the machine learning system begins to condition the denoising based on the text prompt). For example, one trajectory may have a skip step at the N-th iteration, while another trajectory has a skip step at the M-th iteration. Generally, skip steps nearer to the beginning of the denoising process result in outputs that are closer to the prompt and/or further from the reference image, as compared to skip steps nearer to the end of the denoising process. In some aspects, a trajectory may additionally or alternatively be defined based on the conditioning that is used. For example, one trajectory may correspond to conditioning the denoising based on a first text prompt, while a second trajectory corresponds to conditioning the denoising based on a second text prompt. Generally, aspects of the present disclosure can be used to merge or combine any number of trajectories, regardless of how and when those trajectories diverged in the denoising process.

In some aspects, the guidance model(s) can be used to combine different inverse trajectories via compositionality based on different scaling factors. That is, the guidance model may be used to generate guidance scales that are used to aggregate latent tensors from different trajectories. For example, the latent tensors 230A and 230B may be combined using dynamically generated guidance scales (e.g., generated by the guidance model based on input such as the latent tensors 230A-B) to weight the latent tensors 230A and 230B. This combined latent tensor may then be decoded (e.g., using the decoding operation 150 of FIG. 1) to generate an output image.

As another example, in some aspects, different trajectories may be merged for a given time step or iteration using the guidance scales, and the resulting merged latent tensor can then be used as input to the next time step or iteration. For example, the latent tensors 215C and 215J may be merged using dynamic guidance scales, and the resulting aggregated latent tensor can be used as the current latent for the next iteration. In some aspects, at the next time step or in the next iteration, the merged or aggregated latent tensor can be used to compute or generate new latent tensor(s) corresponding to different trajectories, and these new latent tensors can then be similarly merged (using dynamic guidance scales) before proceeding to the following iteration.

In this way, different latent tensors may be generated in a given iteration (e.g., using different conditioning based on different text prompts or sub-prompts), and these latents can be merged using dynamic guidance scales. The merged tensor can then be used to generate new latents (corresponding to new trajectories) for the next iteration, and so on until the final iteration is completed.

Figure 3:
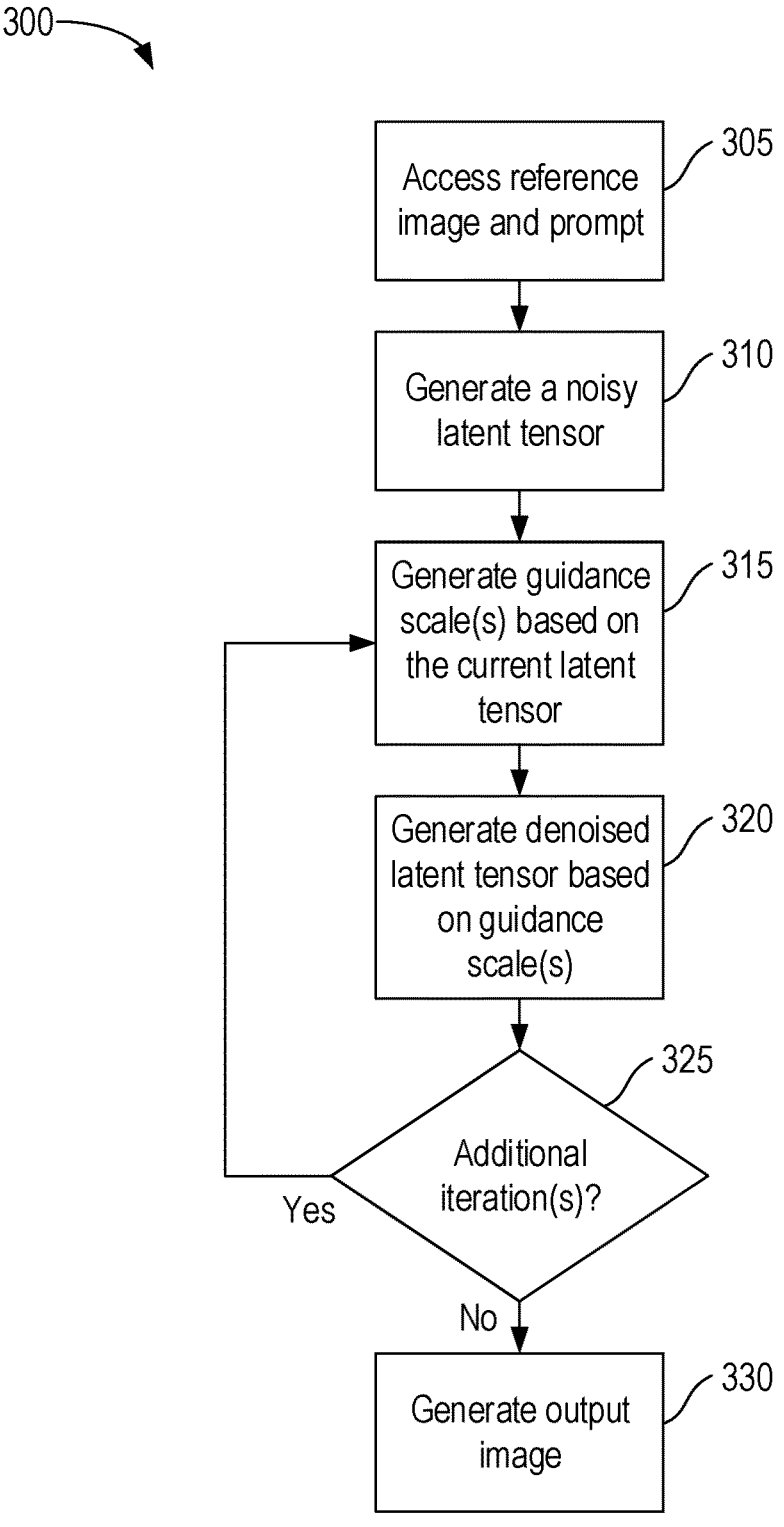
FIG. 3 is a flow diagram depicting an example method for generating images using diffusion models and guidance machine learning models, according to some aspects of the present disclosure.

Example Method for Generating Images Using Diffusion Models and Guidance Machine Learning Models FIG. 3 is a flow diagram depicting an example method 300 for generating images using diffusion models and guidance machine learning models, according to some aspects of the present disclosure. In some aspects, the method 300 is performed by a machine learning system, such as the machine learning system discussed above with reference to FIGS. 1-2.

At block 305, the machine learning system accesses a reference image (e.g., the reference image 110 of FIG. 1) and a prompt (e.g., the prompt 105 of FIG. 1). In some aspects, as discussed above, the reference image is used as the base or starting point of the desired model output, while the prompt indicates the desired changes, modifications, or edits. For example, as discussed above, the reference image may depict objects such as animals, and the prompt may include natural language textual data requesting that modifications such as the number, size, color, or other visual aspect of the animals be changed. As used herein, "accessing" data may generally include receiving, requesting, retrieving, obtaining, collecting, generating, or otherwise gaining access to the data. For example, the machine learning system may access the reference image and prompt as input from a user.

At block 310, the machine learning system generates a noisy latent tensor (e.g., the latent tensor 125N of FIG. 1) based on the reference image. For example, as discussed above, the machine learning system may perform a forward diffusion process to iteratively add noise to the reference image over one or more iterations or time steps (e.g., performing a noising operation, such as the noising operation 130 of FIG. 1, one or more times).

At block 315, the machine learning system generates one or more guidance scales based at least in part on the current latent tensor. As used herein, the "current" latent tensor refers to the latent tensor that is being denoised in a given iteration of a backwards diffusion process (e.g., using the denoising backbone). For example, in the first denoising iteration (e.g., the first iteration of the backward diffusion pass), the "current" tensor is the noisy latent tensor generated during the forward diffusion process (at block 310). In subsequent denoising iterations, the "current" latent tensor is the (relatively denoised) latent tensor that was generated (at block 320) during the immediately prior iteration of the denoising operation.

In some aspects, as discussed above, generating the guidance scale(s) includes processing the latent tensor using a guidance machine learning model (e.g., a relatively small neural network). For example, during the first iteration, the latent tensor generated at block 310 may be used as input to the guidance component 135 of FIG. 1. In some aspects, one or more other inputs may additionally or alternatively be used as input to the guidance model in order to generate the guidance scale(s). For example, in some aspects, the machine learning system generates the guidance scale(s) based on processing data such as the reference image embedding, the prompt embedding(s), an embedding corresponding to the current iteration or time step, the prior guidance scale(s) generated during the immediately prior iteration, and the like.

Although the illustrated example depicts dynamically generating the guidance scales at each iteration, in some aspects, the machine learning system may generate new guidance scales more sparsely. For example, as discussed above, the machine learning system may generate a set of guidance scale(s) for the first denoising iteration and use these scale(s) for each subsequent iteration, may generate new guidance scale(s) every N iterations, and the like.

In some aspects, as discussed above, the machine learning system may generate one or more guidance scales that can be used to weight one or more corresponding latent tensors during denoising. For example, an image guidance scale may indicate the weight of the reference image (or a latent generated based on the reference image), while a prompt guidance scale may indicate the weight of the prompt (or a latent generated based on the prompt). In some aspects, if the prompt is delineated into multiple sub-prompts (e.g., a first stating "change the horse from brown to black" and a second stating "replace the field with a forest"), the machine learning system may generate a respective guidance scale for each respective sub-prompt.

Additional explanation for generating guidance scale(s) in some aspects is discussed in more detail below with reference to FIG. 4.

At block 320, the machine learning system generates a (relatively) denoised latent tensor based on the guidance scale(s) (generated at block 315) and the current latent tensor that was used to generate the guidance scales. For example, as discussed above, in the first iteration, the current latent tensor is the noisy latent tensor generated at block 310. In each subsequent iteration, the current latent tensor is the (somewhat denoised) latent tensor that was generated during the immediately prior iteration of the denoising backbone.

In some aspects, as discussed above and in more detail below, generating the denoised latent tensor includes generating one or more intermediate latent tensors and weighting these intermediate latent tensors based on corresponding guidance scale(s). The weighted intermediate tensors can then be aggregated (e.g., by summation). One example method for generating the denoised latent tensor is discussed in more detail below with reference to FIG. 5.

In some aspects, the denoised latent tensor is referred to as "denoised" to indicate that this tensor is intended to contain less noise than the "current" latent tensor that is being processed. That is, at each iteration or time step of processing data using the denoising backbone, the machine learning system seeks to reduce the noise in the latent tensor by at least some amount. At the end of the denoising process, the output may similarly be referred to as a denoised latent tensor to indicate that the noise (generated at block 310) has been removed.

At block 325, the machine learning system determines whether there remains at least one additional iteration of processing data using the denoising backbone. For example, as discussed above, the machine learning system may determine whether a predefined number of iterations have been completed. If not, the method 300 returns to block 315 to perform a new iteration. As discussed above, during this new iteration, the "current" latent tensor may be the denoised latent tensor generated at block 320 of the "prior" iteration.

Returning to block 325, if the machine learning system determines that no additional iterations remain, the method 300 continues to block 330. At block 330, the machine learning system generates an output image based on the denoised latent tensor generated during the final iteration. For example, as discussed above, the final denoised latent tensor may be processed using a decoder model (e.g., the decoding operation 150 of FIG. 1) to generate an output image (e.g., the generated image 155 of FIG. 1). As discussed above, this output image may generally correspond to or depict the reference image modified based on the prompt(s) provided as input to the diffusion model.

Although not depicted in the illustrated example, in some aspects, the machine learning system may then perform a number of operations using the generated image. For example, the machine learning system may output the generated image via one or more output devices (e.g., displays) for user review.

Example Method for Generating Dynamic Guidance Scales Using Guidance Machine Learning Models FIG. 4 is a flow diagram depicting an example method 400 for generating dynamic guidance scales using guidance machine learning models, according to some aspects of the present disclosure. In some aspects, the method 400 is performed by a machine learning system, such as the machine learning system discussed above with reference to FIGS. 1-3. In some aspects, the method 400 provides additional detail for block 315 of FIG. 3.

At block 405, the machine learning system accesses the previous set of guidance scale(s) that were generated and/or used during the immediately prior or previous iteration of processing data using the denoising backbone of the diffusion model. For example, referring to FIG. 2, when generating guidance scales used to generate the latent tensor 215I, the machine learning system may access guidance scale(s) that were used to generate the latent tensor 215H.

At block 410, the machine learning system accesses a time step embedding corresponding to the iteration that is currently being performed. For example, as discussed above, these time step embeddings may be used to assist or guide the denoising operation (e.g., used as input to the model component(s) that generate denoised latent tensors) as well as to assist or guide the guidance scale generation process.

At block 415, the machine learning system accesses a reference image embedding (e.g., the latent tensor 125A of FIG. 1) that corresponds to the reference image provided as input to the diffusion model.

At block 420, the machine learning system accesses a prompt embedding (e.g., corresponding to the prompt 105 of FIG. 1) that was provided as input to the diffusion model. In some aspects, if multiple prompts (or sub-prompts) are being used to modify the reference image, the machine learning system may access the embedding of a given sub-prompt in order to generate a guidance scale for the given sub-prompt.

At block 425, the machine learning system processes one or more of these input(s) (accessed at blocks 405 through 420) using a guidance machine learning model (e.g., the guidance component(s) 135 of FIG. 1).

In this way, as discussed above, the machine learning system can generate dynamic guidance scale(s) for one or more iterations based on the inputs themselves (e.g., based on the latent tensor that is currently being denoised), which can result in an improved denoising process. This can improve the quality of the output image(s) generated by the diffusion model.

Example Method for Generating and Aggregating Latent Tensors Using Dynamic Guidance Scales FIG. 5 is a flow diagram depicting an example method 500 for generating and aggregating latent tensors using dynamic guidance scales, according to some aspects of the present disclosure. In some aspects, the method 500 is performed by a machine learning system, such as the machine learning system discussed above with reference to FIGS. 1-4. In some aspects, the method 500 provides additional detail for block 320 of FIG. 3.

At block 505, the machine learning system generates a first latent tensor based on a first conditioning (e.g., conditioning the denoising component based on a first set of input(s)). For example, if multiple sub-prompts are being used, the machine learning system may generate the first intermediate latent tensor based on a first sub-prompt. As another example, the machine learning system may generate multiple intermediate latent tensors with and without various conditioning inputs, as discussed in more detail below. For example, the machine learning system may generate a first intermediate latent tensor based on the reference image and a second intermediate latent tensor based on the prompt embedding.

At block 510, the machine learning system generates a second latent tensor based on second conditioning. For example, as discussed above, the machine learning system may generate the second intermediate latent tensor based on a second sub-prompt, based on the reference image (as compared to generating the second intermediate tensor based on the prompt), and the like.

At block 515, the machine learning system determines whether there are additional conditioning combination(s) remaining (e.g., additional sub-prompts). If so, the method 500 proceeds to block 525, where the machine learning system generates an additional or further latent tensor based on this further conditioning. The method 500 then returns to block 515, allowing the machine learning system to generate any number and variation of intermediate tensors.

Returning to block 515, if the machine learning system determines that there are no further intermediate tensors, the method 500 continues to block 520. At block 520, the machine learning system aggregates the intermediate latent tensors based on the guidance scales generated for and/or used in the current iteration of processing data using the denoising backbone of the diffusion model. For example, as discussed above, the machine learning system may weight each intermediate tensor based on a corresponding guidance scale, and sum these weighted tensors. The resulting aggregated tensor may correspond to the (relatively) denoised latent tensor for the current iteration, as discussed above.

As one example, in some aspects, the machine learning system may define the denoised latent tensor using Equation 1 below, where $\hat{\in}$ is the denoised latent tensor, $\in_\theta(x_t, t, z_1, z_x)$ is an intermediate tensor generated by processing the indicated inputs using the denoising model (e.g., the denoising operation 140 of FIG. 1), $\lambda_x$ is a first guidance scale corresponding to the text prompt, and $\lambda_1$ is a second guidance scale corresponding to the reference image. Specifically, in Equation 1, $\in_\theta(x_t, t, \emptyset, \emptyset)$ indicates an intermediate tensor generated based on the current latent tensor for the t-th iteration $(x_t)$ and the current time step embedding t, $\in_\theta(x_t, t, z_1, z_x)$ indicates an intermediate tensor generated based on the current latent tensor, the time step embedding, the embedding of the reference image $(z_1)$, and the embedding of the prompt text $(z_x)$, and $\in_\theta(x_t, t, z_1, \emptyset)$ indicates an intermediate tensor generated based on the current latent tensor, the time step embedding, and the reference image embedding (without conditioning based on the prompt).

$$\hat{\in} = \in_\theta(x_t, t, \emptyset, \emptyset) + \lambda_x(\in_\theta(x_t, t, z_1, z_x) - \in_\theta(x_t, t, z_1, \emptyset)) + \tag{1}$$
$$\lambda_1(\in_\theta(x_t, t, z_1, \emptyset) - \in_\theta(x_t, t, \emptyset, \emptyset))$$

In aspects, by generating dynamic guidance scales for each conditioning (e.g., one scale for the model when conditioning based on the reference image, one conditioning for the model when conditioned based on the prompt, and the like), the machine learning system can generate substantially improved model output (e.g., output images that more accurately reflect the user's intent when providing the reference image and prompt) while avoiding generative collapse and improving output diversity.

Example Method for Using Guidance Machine Learning Models

FIG. 6 is a flow diagram depicting an example method 600 for using guidance machine learning models, according to some aspects of the present disclosure. In some aspects, the method 600 is performed by a machine learning system, such as the machine learning system discussed above with reference to FIGS. 1-5.

At block 605, a first latent tensor generated during a first iteration of processing data using a denoising backbone of a diffusion machine learning model is accessed.

At block 610, a first guidance scale is generated based on processing the first latent tensor using a guidance machine learning model.

At block 615, a second latent tensor is generated during a second iteration of processing data using the denoising backbone based on the first latent tensor and the first guidance scale.

In some aspects, generating the second latent tensor comprises generating a first intermediate tensor, based on the first latent tensor, using the denoising backbone, weighting the first intermediate tensor based on the first guidance scale, and aggregating the weighted first intermediate tensor with at least a second intermediate tensor to generate the second latent tensor.

In some aspects, the first guidance scale corresponds to a weight for conditioning the denoising backbone based on a text prompt, the first intermediate tensor corresponds to the text prompt, and the second intermediate tensor corresponds to an image prompt.

At block 620, an output from the diffusion machine learning model is generated based at least in part on the second latent tensor.

In some aspects, the method 600 further includes generating a second guidance scale based on processing the first latent tensor using the guidance machine learning model, and generating the first intermediate tensor, based on the first latent tensor, using the denoising backbone, wherein aggregating the weighted first intermediate tensor with the second intermediate tensor comprises weighting the second intermediate tensor based on the second guidance scale.

In some aspects, the first guidance scale corresponds to a weight for a first inverse trajectory of processing data using the denoising backbone, and the second guidance scale corresponds to a weight for a second inverse trajectory of processing data using the denoising backbone.

In some aspects, the first inverse trajectory corresponds to conditioning of the denoising backbone using a first prompt during the first iteration, and the second inverse trajectory corresponds to conditioning of the denoising backbone using a second prompt during the first iteration.

In some aspects, the method 600 further includes generating a second guidance scale based on processing the second latent tensor using the guidance machine learning model, and generating a third latent tensor during a third iteration of processing data using the denoising backbone based on the second latent tensor and the second guidance scale.

In some aspects, the first guidance scale is generated based further on processing a second guidance scale using the guidance machine learning model, the second guidance scale corresponds to a third iteration of processing data using the denoising backbone, and the third iteration was performed prior to the first iteration.

In some aspects, the first guidance scale is generated based further on processing a time step embedding corresponding to the first iteration using the guidance machine learning model.

In some aspects, the first guidance scale is generated based further on processing a reference image embedding using the guidance machine learning model, and the first latent tensor was generated based at least in part on the reference image embedding.

In some aspects, the first guidance scale is generated based further on processing a text prompt embedding using the guidance machine learning model, and the first latent tensor was generated based at least in part on the text prompt embedding.

Example Processing System for Machine Learning

Figure 7:
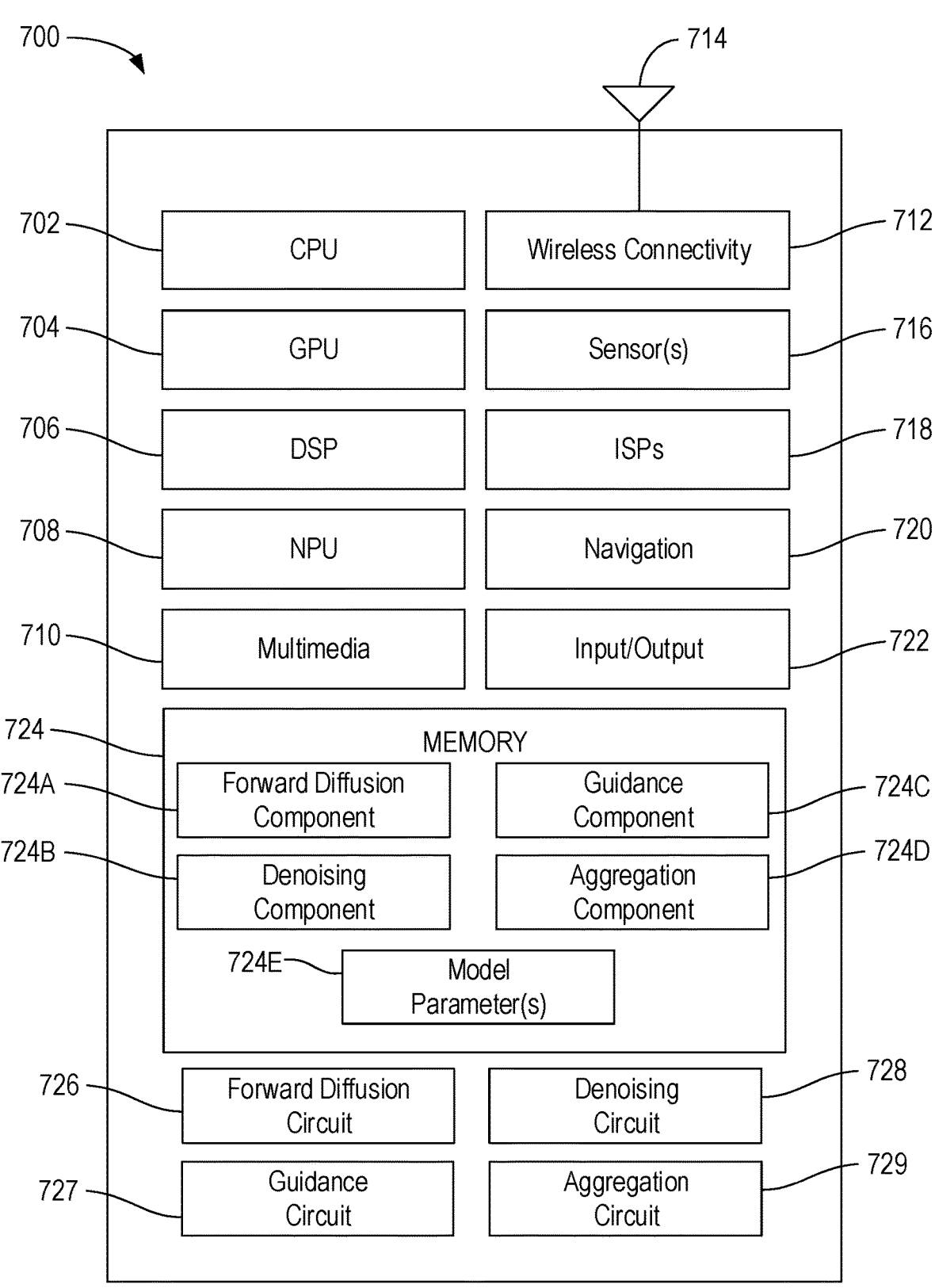
FIG. 7 depicts an example processing system configured to perform various aspects of the present disclosure.

FIG. 7 depicts an example processing system 700 configured to perform various aspects of the present disclosure, including, for example, the techniques and methods described with respect to FIGS. 1-6. In some aspects, the processing system 700 may correspond to a machine learning system. For example, the processing system 700 may correspond to a system that trains machine learning models (e.g., guidance models) and/or uses trained machine learning models for image generation or editing. Although depicted as a single system for conceptual clarity, in some aspects, as discussed above, the operations described below with respect to the processing system 700 may be distributed across any number of devices or systems.

The processing system 700 includes a central processing unit (CPU) 702, which in some examples may be a multi-core CPU. Instructions executed at the CPU 702 may be loaded, for example, from a program memory associated with the CPU 702 or may be loaded from a memory partition (e.g., a partition of a memory 724).

The processing system 700 also includes additional processing components tailored to specific functions, such as a graphics processing unit (GPU) 704, a digital signal processor (DSP) 706, a neural processing unit (NPU) 708, a multimedia component 710 (e.g., a multimedia processing unit), and a wireless connectivity component 712.

An NPU, such as the NPU 708, is generally a specialized circuit configured for implementing the control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as the NPU 708, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this piece of data through an already trained model to generate a model output (e.g., an inference).

In some implementations, the NPU 708 is a part of one or more of the CPU 702, the GPU 704, and/or the DSP 706.

In some examples, the wireless connectivity component 712 may include subcomponents, for example, for third generation (3G) connectivity, fourth generation (4G) connectivity (e.g., Long-Term Evolution (LTE)), fifth generation (5G) connectivity (e.g., New Radio (NR)), Wi-Fi connectivity, Bluetooth connectivity, and other wireless data transmission standards. The wireless connectivity component 712 is further coupled to one or more antennas 714.

The processing system 700 may also include one or more sensor processing units 716 associated with any manner of sensor, one or more image signal processors (ISPs) 718 associated with any manner of image sensor, and/or a navigation processor 720, which may include satellite-based positioning system components (e.g., GPS or GLONASS) as well as inertial positioning system components.

The processing system 700 may also include one or more input and/or output devices 722, such as screens, touch-sensitive surfaces (including touch-sensitive displays), physical buttons, speakers, microphones, and the like.

In some examples, one or more of the processors of the processing system 700 may be based on an ARM or RISC-V instruction set.

The processing system 700 also includes a memory 724, which is representative of one or more static and/or dynamic memories, such as a dynamic random access memory, a flash-based static memory, and the like. In this example, the memory 724 includes computer-executable components, which may be executed by one or more of the aforementioned processors of the processing system 700.

In particular, in this example, the memory 724 includes forward diffusion component 724A, a denoising component 724B, a guidance component 724C, and an aggregation component 724D. Although not depicted in the illustrated example, the memory 724 may also include other components, such as an inferencing or generation component to manage the generation of data (e.g., edited images) using trained machine learning models, as discussed above, a training component used to train the guidance model(s) or other components, and the like. Though depicted as discrete components for conceptual clarity in FIG. 7, the illustrated components (and others not depicted) may be collectively or individually implemented in various aspects.

As illustrated, the memory 724 also includes a set of model parameters 724E (e.g., parameters of one or more machine learning models or components thereof). For example, the model parameters 724E may include parameters for components such as the embedding operation 120, the noising operation 130, the denoising operation 140, the guidance component 135, and/or the decoding operation 150, each of FIG. 1. Although not depicted in the illustrated example, the memory 724 may also include other data such as training data (e.g., training exemplars including reference images, target images, and text prompts).

The processing system 700 further comprises a forward diffusion circuit 726, a denoising circuit 727, a guidance circuit 728, and an aggregation circuit 729. The depicted circuits, and others not depicted (such as an inferencing circuit), may be configured to perform various aspects of the techniques described herein.

The forward diffusion component 724A and/or the forward diffusion circuit 726 (which may correspond to the noising operation(s) 130 of FIG. 1) may be used to generate new (noisier) latent tensors based on current latent tensors, as discussed above. For example, the forward diffusion component 724A and/or the forward diffusion circuit 726 may be used to iteratively add noise to latent tensors until a defined number of iterations or time steps are completed.

The denoising component 724B and/or the denoising circuit 727 (which may correspond to the denoising operation(s) 140 of FIG. 1) may be used to iteratively denoise latent tensors based on the prompt text and a set of guidance scales, as discussed above. For example, at each iteration, the denoising component 724B and/or the denoising circuit 727 may generate a denoised latent tensor (such as the latent tensors 145 of FIG. 1). By processing these latent tensors iteratively (removing noise at each iteration), the denoising component 724B and/or the denoising circuit 727 may generate improved output images, as discussed above.

The guidance component 724C and/or the guidance circuit 728 (which may correspond to the guidance component(s) 135 of FIG. 1) may be used to generate guidance scales for the denoising backbone, as discussed above. For example, the guidance component 724C and/or the guidance circuit 728 may process data such as the image embedding (e.g., the latent tensor 125A), the text encoding (e.g., the embedding 122), the latent tensor at each iteration, and the like to generate a new set of guidance scales that are used as input to the denoising backbone to guide the diffusion process.

The aggregation component 724D and/or the aggregation circuit 729 may be used to aggregate intermediate tensors based on the guidance scales, as discussed above. For example, the aggregation component 724D and/or the aggregation circuit 729 may be used to weight intermediate tensors based on corresponding guidance scales, and sum or otherwise combine these weighted tensors.

Though depicted as separate components and circuits for clarity in FIG. 7, the forward diffusion circuit 726, the denoising circuit 727, the guidance circuit 728, and the aggregation circuit 729 may collectively or individually be implemented in other processing devices of the processing system 700, such as within the CPU 702, the GPU 704, the DSP 706, the NPU 708, and the like.

Generally, the processing system 700 and/or components thereof may be configured to perform the methods described herein.

Notably, in other aspects, aspects of the processing system 700 may be omitted, such as where the processing system 700 is a server computer or the like. For example, the multimedia component 710, the wireless connectivity component 712, the sensor processing units 716, the ISPs 718, and/or the navigation processor 720 may be omitted in other aspects. Further, aspects of the processing system 700 maybe distributed between multiple devices.

Example Clauses

Implementation examples are described in the following numbered clauses:

Clause 1: A method, comprising: accessing a first latent tensor generated during a first iteration of processing data using a denoising backbone of a diffusion machine learning model; generating a first guidance scale based on processing the first latent tensor using a guidance machine learning model; generating a second latent tensor during a second iteration of processing data using the denoising backbone based on the first latent tensor and the first guidance scale; and generating an output from the diffusion machine learning model based at least in part on the second latent tensor Clause 2: A method according to Clause 1, wherein generating the second latent tensor comprises: generating a first intermediate tensor, based on the first latent tensor, using the denoising backbone; weighting the first intermediate tensor based on the first guidance scale; and aggregating the weighted first intermediate tensor with at least a second intermediate tensor to generate the second latent tensor.

Clause 3: A method according to Clause 2, wherein: the first guidance scale corresponds to a weight for conditioning the denoising backbone based on a text prompt, the first intermediate tensor corresponds to the text prompt, and the second intermediate tensor corresponds to an image prompt.

Clause 4: A method according to any of Clauses 2-3, further comprising: generating a second guidance scale based on processing the first latent tensor using the guidance machine learning model; and generating the first intermediate tensor, based on the first latent tensor, using the denoising backbone, wherein aggregating the weighted first intermediate tensor with the second intermediate tensor comprises weighting the second intermediate tensor based on the second guidance scale.

Clause 5: A method according to Clause 4, wherein: the first guidance scale corresponds to a weight for a first inverse trajectory of processing data using the denoising backbone, and the second guidance scale corresponds to a weight for a second inverse trajectory of processing data using the denoising backbone.

Clause 6: A method according to Clause 5, wherein: the first inverse trajectory corresponds to conditioning of the denoising backbone using a first prompt during the first iteration, and the second inverse trajectory corresponds to conditioning of the denoising backbone using a second prompt during the first iteration.

Clause 7: A method according to any of Clauses 1-6, further comprising: generating a second guidance scale based on processing the second latent tensor using the guidance machine learning model; and generating a third latent tensor during a third iteration of processing data using the denoising backbone based on the second latent tensor and the second guidance scale.

Clause 8: A method according to any of Clauses 1-7, wherein: the first guidance scale is generated based further on processing a second guidance scale using the guidance machine learning model, the second guidance scale corresponds to a third iteration of processing data using the denoising backbone, and the third iteration was performed prior to the first iteration.

Clause 9: A method according to any of Clauses 1-8, wherein the first guidance scale is generated based further on processing a time step embedding corresponding to the first iteration using the guidance machine learning model.

Clause 10: A method according to any of Clauses 1-9, wherein: the first guidance scale is generated based further on processing a reference image embedding using the guidance machine learning model, and the first latent tensor was generated based at least in part on the reference image embedding.

Clause 11: A method according to any of Clauses 1-10, wherein: the first guidance scale is generated based further on processing a text prompt embedding using the guidance machine learning model, and the first latent tensor was generated based at least in part on the text prompt embedding.

Clause 12: A processing system comprising: a memory comprising computer-executable instructions; and one or more processors configured to execute the computer-executable instructions and cause the processing system to perform a method in accordance with any of Clauses 1-11.

Clause 13: A processing system comprising means for performing a method in accordance with any of Clauses 1-11.

Clause 14: A non-transitory computer-readable medium comprising computer-executable instructions that, when executed by one or more processors of a processing system, cause the processing system to perform a method in accordance with any of Clauses 1-11.

Clause 15: A computer program product embodied on a computer-readable storage medium comprising code for performing a method in accordance with any of Clauses 1-11.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processing system comprising:
one or more memories comprising processor-executable instructions; and
one or more processors configured to execute the processor-executable instructions and cause the processing system to:
    access a first latent tensor generated during a first iteration of processing data using a denoising backbone of a diffusion machine learning model;
    generate a first guidance scale based on processing the first latent tensor using a guidance machine learning model;
    generate a second latent tensor during a second iteration of processing data using the denoising backbone based on the first latent tensor and the first guidance scale;
    generate an output from the diffusion machine learning model based at least in part on the second latent tensor;
    generate a second guidance scale based on processing the first latent tensor using the guidance machine learning model; and
    generate the first intermediate tensor, based on the first latent tensor, using the denoising backbone, wherein, to aggregate the weighted first intermediate tensor with the second intermediate tensor, the one or more processors are configured to execute the processor-executable instructions and cause the processing system to weight the second intermediate tensor based on the second guidance scale;
    wherein, to generate the second latent tensor, the one or more processors are configured to execute the processor-executable instructions and cause the processing system to:
    generate a first intermediate tensor, based on the first latent tensor, using the denoising backbone;
    weight the first intermediate tensor based on the first guidance scale; and
    aggregate the weighted first intermediate tensor with at least a second intermediate tensor to generate the second latent tensor;
    wherein:
      the first guidance scale corresponds to a weight for a first inverse trajectory of processing data using the denoising backbone, and
      the second guidance scale corresponds to a weight for a second inverse trajectory of processing data using the denoising backbone.

2. The processing system of claim 1, wherein:
the first guidance scale corresponds to a weight for conditioning the denoising backbone based on a text prompt,
the first intermediate tensor corresponds to the text prompt, and
the second intermediate tensor corresponds to an image prompt.

3. The processing system of claim 1, wherein:
the first inverse trajectory corresponds to conditioning of the denoising backbone using a first prompt during the first iteration, and the second inverse trajectory corresponds to conditioning of the denoising backbone using a second prompt during the first iteration.

4. The processing system of claim 1, wherein the one or more processors are configured to further execute the processor-executable instructions and cause the processing system to:
    generate a second guidance scale based on processing the second latent tensor using the guidance machine learning model; and
    generate a third latent tensor during a third iteration of processing data using the denoising backbone based on the second latent tensor and the second guidance scale.

5. The processing system of claim 1, wherein:
the first guidance scale is generated based further on processing a second guidance scale using the guidance machine learning model,
the second guidance scale corresponds to a third iteration of processing data using the denoising backbone, and
the third iteration was performed prior to the first iteration.

6. The processing system of claim 1, wherein the first guidance scale is generated based further on processing a time step embedding corresponding to the first iteration using the guidance machine learning model.

7. The processing system of claim 1, wherein:
the first guidance scale is generated based further on processing a reference image embedding using the guidance machine learning model, and
the first latent tensor was generated based at least in part on the reference image embedding.

8. The processing system of claim 1, wherein:
the first guidance scale is generated based further on processing a text prompt embedding using the guidance machine learning model, and
the first latent tensor was generated based at least in part on the text prompt embedding.

9. A processor-implemented method of image generation, comprising:
    accessing a first latent tensor generated during a first iteration of processing data using a denoising backbone of a diffusion machine learning model;
    generating a first guidance scale based on processing the first latent tensor using a guidance machine learning model;
    generating a second latent tensor during a second iteration of processing data using the denoising backbone based on the first latent tensor and the first guidance scale;
    generating an output from the diffusion machine learning model based at least in part on the second latent tensor;
    generating a second guidance scale based on processing the first latent tensor using the guidance machine learning model; and
    generating the first intermediate tensor, based on the first latent tensor, using the denoising backbone, wherein aggregating the weighted first intermediate tensor with the second intermediate tensor comprises weighting the second intermediate tensor based on the second guidance scale;
    wherein generating the second latent tensor comprises:
      generating a first intermediate tensor, based on the first latent tensor, using the denoising backbone;
      weighting the first intermediate tensor based on the first guidance scale; and
      aggregating the weighted first intermediate tensor with at least a second intermediate tensor to generate the second latent tensor.

10. The processor-implemented method of claim 9, wherein:

the first guidance scale corresponds to a weight for conditioning the denoising backbone based on a text prompt, the first intermediate tensor corresponds to the text prompt, and the second intermediate tensor corresponds to an image prompt.

11. The processor-implemented method of claim 9, wherein:

the first guidance scale corresponds to a weight for a first inverse trajectory of processing data using the denoising backbone, and the second guidance scale corresponds to a weight for a second inverse trajectory of processing data using the denoising backbone.

12. The processor-implemented method of claim 11, wherein:

the first inverse trajectory corresponds to conditioning of the denoising backbone using a first prompt during the first iteration, and the second inverse trajectory corresponds to conditioning of the denoising backbone using a second prompt during the first iteration.

13. The processor-implemented method of claim 9, further comprising:

generating a second guidance scale based on processing the second latent tensor using the guidance machine learning model; and generating a third latent tensor during a third iteration of processing data using the denoising backbone based on the second latent tensor and the second guidance scale.

14. The processor-implemented method of claim 9, wherein:

the first guidance scale is generated based further on processing a second guidance scale using the guidance machine learning model, the second guidance scale corresponds to a third iteration of processing data using the denoising backbone, and the third iteration was performed prior to the first iteration.

15. The processor-implemented method of claim 9, wherein:

the first guidance scale is generated based further on processing a reference image embedding and a text prompt embedding using the guidance machine learning model, and the first latent tensor was generated based at least in part on the reference image embedding and the text prompt embedding.

* * * * *